US007638914B2

(12) United States Patent
Miekka

(10) Patent No.: US 7,638,914 B2
(45) Date of Patent: Dec. 29, 2009

(54) PERMANENT MAGNET BONDING CONSTRUCTION

(75) Inventor: Fred N Miekka, Arcadia, CA (US)

(73) Assignee: Sierra Madre Mktg Group, Arcadia, CA (US)

(*) Notice: Subject to any disclaimer, the term of this patent is extended or adjusted under 35 U.S.C. 154(b) by 29 days.

(21) Appl. No.: 11/700,928

(22) Filed: Feb. 1, 2007

(65) Prior Publication Data
US 2007/0176506 A1 Aug. 2, 2007

Related U.S. Application Data

(60) Provisional application No. 60/764,085, filed on Feb. 1, 2006.

(51) Int. Cl.
H02K 23/04 (2006.01)
(52) U.S. Cl. .............. 310/154.01; 310/154.03; 310/154.07; 310/154.21; 310/156.11
(58) Field of Classification Search ............ 310/154.03, 310/4, 7, 8, 21, 156.12–14, 38, 154.01, 154.05, 310/154.06, 154.09
See application file for complete search history.

(56) References Cited

U.S. PATENT DOCUMENTS

| 3,165,654 | A | * | 1/1965 | Mabuchi ................. 310/46 |
| 4,011,120 | A | | 3/1977 | Aggen |
| 4,464,595 | A | * | 8/1984 | Hamano et al. ........ 310/154.07 |
| 4,587,449 | A | * | 5/1986 | West ................. 310/154.27 |
| 4,594,525 | A | * | 6/1986 | Stokes ............... 310/156.13 |
| 4,625,392 | A | * | 12/1986 | Stokes ................... 29/598 |
| 4,793,054 | A | * | 12/1988 | Abbratozzato et al. ...... 29/596 |
| 4,920,634 | A | | 5/1990 | Cole |
| 4,954,736 | A | * | 9/1990 | Kawamoto et al. ..... 310/156.21 |
| 5,264,749 | A | * | 11/1993 | Maeda et al. ........ 310/154.07 |
| 5,397,951 | A | * | 3/1995 | Uchida et al. ........ 310/156.21 |
| 5,939,809 | A | * | 8/1999 | Mobius ............... 310/156.28 |
| 6,094,119 | A | * | 7/2000 | Reznik et al. ............. 335/284 |
| 6,522,042 | B1 | * | 2/2003 | Du et al. ............. 310/154.03 |
| 6,974,522 | B2 | * | 12/2005 | Peresada et al. .......... 156/293 |
| 7,116,026 | B2 | * | 10/2006 | Kuwabara et al. ..... 310/156.21 |
| 2002/0135252 | A1 | * | 9/2002 | Burton ............... 310/156.12 |
| 2002/0171307 | A1 | * | 11/2002 | Verbrugge et al. ..... 310/156.12 |
| 2003/0025408 | A1 | * | 2/2003 | Miekka et al. ........... 310/68 R |
| 2004/0217664 | A1 | * | 11/2004 | Kuwabara et al. ..... 310/156.21 |

FOREIGN PATENT DOCUMENTS

JP 01231631 A * 9/1989

* cited by examiner

*Primary Examiner*—Quyen Leung
*Assistant Examiner*—Naishadh N Desai

(57) ABSTRACT

Bonding geometries are disclosed between permanent magnets and steel portions of magnetic assemblies. When employed in permanent magnet motors, this particular bonding construction reduces or even eliminates the loosening of permanent magnets inside of electric motors. The bonding geometry consists of interlocking protrusions and voids at the bonding interface. A bonding agent is employed that may be filled with finely divided iron or other magnetic material. The result is a strong bond between the permanent magnet and steel assembly portions with virtually no loss in overall magnetic properties.

16 Claims, 5 Drawing Sheets

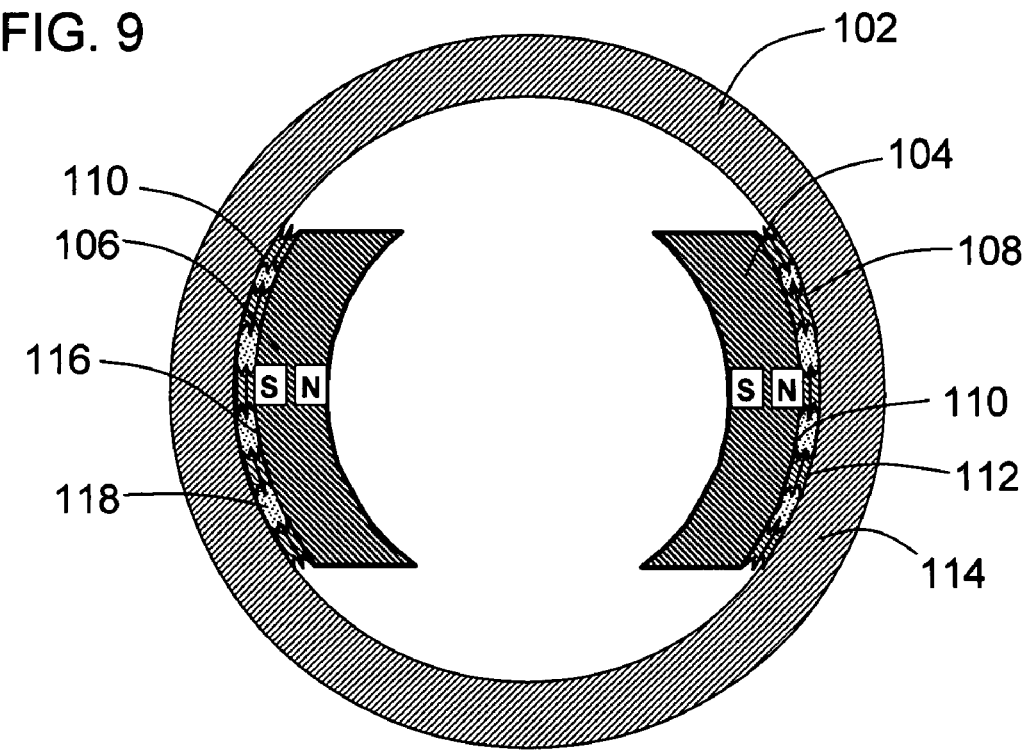
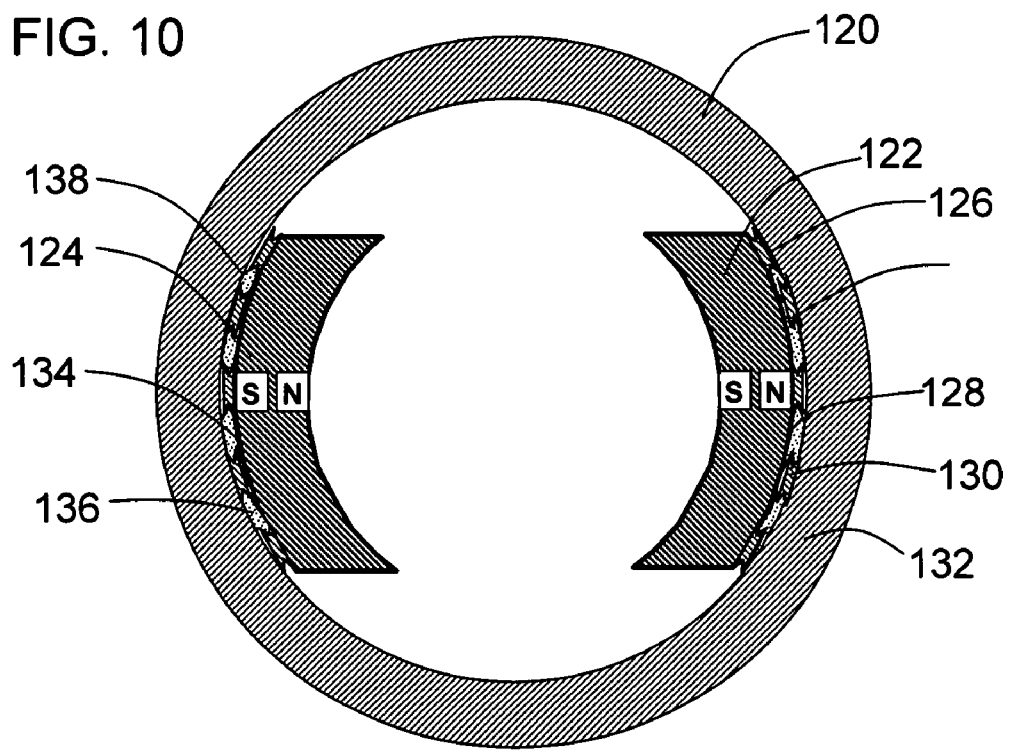

PERMANENT MAGNET BONDING CONSTRUCTION

CROSS-REFERENCE TO RELATED APPLICATIONS

This non-provisional application claims benefit of the provisional application filed on Feb. 1, 2006 having application No. U.S. 60/764,085. This non-provisional application also claims benefit of provisional application filed on Jan. 25, 2007 having application No. 60/897,325.

BACKGROUND OF THE INVENTION

1. Field of the Invention

This invention relates to bonding permanent magnets in steel construction and more particularly to interlocking bonding geometries for bonding permanent magnets to steel portions of magnet assemblies. This bonding construction is particularly well suited for use in bonding permanent magnets to steel motor housings.

2. Description of the Related Art

Permanent magnets are pieces of material that retain a magnetic field after being exposed to a magnetizing field. Once magnetized they do not need energy input to maintain their field. As a result, they have found numerous uses. Of particular interest is their use in electric motors. Electric motors generate torque by the interaction of magnetic fields. Prior to the development of strong permanent magnets, electric motors employed both stationary and moving electromagnets to generate the interacting magnetic fields needed to generate torque.

Electricity is required to produce magnetic fields within electromagnets. The result is often a substantial amount of electrical loss within the electromagnets themselves. In addition, since power has to be supplied to moving electromagnet windings, some sort of brush system is also required. General electric developed the first permanent magnet material that was strong enough to replace some of the electromagnets in electric motors. This magnet material was called Alnico and shortly thereafter several grades became commercially available. Improved permanent magnets made possible permanent magnet motors.

A permanent magnet motor is an electric motor employing permanent magnets as the fixed magnetic field and electromagnets as the changing interacting magnetic field. The use of permanent magnets in electric motors improved their reliability and reduced manufacturing costs. There are numerous configurations possible with permanent magnet motors. One common configuration involves placing curved permanent magnets against a motor housing and having a rotatable electromagnet assembly located centrally within the field of the permanent magnets. The bonding of permanent magnets into motor housings may be accomplished using a balloon to press the permanent magnets against the housing and using epoxy resin to adhere the magnets firmly into place. When the epoxy finishes curing, the balloon may be deflated and removed. Another method that can be used for bonding permanent magnets in magnetic assemblies is disclosed in U.S. Pat. No. 4,011,120 titled "Method For Fastening Ceramic Magnets To A Flywheel Using Centrifugal Force". U.S. Pat. No. 4,011,120 discloses the placement of permanent magnets having applied adhesive against the inner surface of a flywheel and spinning the flywheel in a special fixture having positioning pins. The centrifugal force created by the spinning action holds the magnets in place until the adhesive sets.

The torque generated in permanent magnet motors depends on the field strength of the permanent magnets and the field strength of the interacting field of the electromagnets. The stronger the field of the permanent magnets the greater will be the torque. The stronger the field of the electromagnets, the stronger will be the torque.

Permanent magnets can withstand a limited demagnetizing field. If too much current is applied to the electromagnets of a permanent magnet motor the permanent magnets will demagnetize, and the motor will cease to function properly. Because of this, the power supplied to permanent magnet motors needs to be limited.

As time progressed so did permanent magnet development. Today, there are strong permanent magnet materials that resist the forces of demagnetization and have inherently strong magnetic fields. Permanent magnets made from certain rare earth compositions such as neodymium iron boron can have very good properties for use in permanent magnet motors.

A bit needs to be said about the standard design of permanent magnet motors with respect to the permanent magnets themselves. In the standard configuration, curved permanent magnets are placed against a steel motor housing. The magnets face each other with opposite poles aligned. Magnetic flux travels through the steel motor housing from the back of one magnet to the other. The central portion where the rotating electromagnet assembly spins is open with the field of the permanent magnets traveling through. The pathway of magnetic flux forms closed loops between the permanent magnets, the steel motor housing, and the air space in the central portion of the motor. This pathway is sometimes referred to as the "magnetic circuit".

When magnetic flux travels through air, it is said to be traveling through an "air gap". Generally speaking, the greater the air gap, the less will be the torque of the motor. Because of this, designers of electric motors often reduce this air gap to the bare minimum. It should be noted that the thin layer of epoxy bonding the permanent magnets to the housing can be considered to be an air gap due to the fact that like air, epoxy is a poor conductor of magnetic flux. Examples of this are numerous and thin non-magnetic materials are often used as part of magnet bonding and/or holding assemblies. An example of this can be found in U.S. Pat. No. 4,920,634 titled "Permanent Magnet Rotor With Magnet Retention Band" incorporated herein by reference. U.S. Pat. No. 4,920,630 discloses the use of a non-magnetic retention band wrapped around the rotor magnets of a permanent magnet electric motor. The opposite ends of the band are extended inwardly in the space between the magnets and firmly secured to the rotor core. In circumferentially spaced relation to the secured ends, a further securement of the band is established between the band and the rotor core. The apparatus and method disclosed in U.S. Pat. No. 4,920,634 has the advantage of allowing the band to be of minimal thickness thereby minimizing the air gap.

Strong rare earth permanent magnet motors can be made small in size, light in weight and very powerful. Because of this, it is often the case that permanent magnet motors employing rare earth magnets run hot. The result is that the epoxy holding the permanent magnets to the motor housing may be compromised resulting in bond failure. Once this happens, the permanent magnets slide around loosely within the motor and may jam the rotor.

In addition to thermal instabilities to the bond between permanent magnets and their motor housings, high torque values are often associated with rare earth permanent magnet motors. These high torque values add further strain to the bond between the motor housing and permanent magnets.

It is an object of this invention to provide good bonding of permanent magnets to steel in magnetic assemblies.

It is an object of this invention to provide good bonding of permanent magnets to motor housings.

It is a further object of this invention to provide bonds that are stable to high temperatures.

It is a further object of this invention to provide a strong bond between a permanent magnet and motor housing capable of withstanding large torque values.

Finally, it is an object of this invention to provide a bonding method between a permanent magnet and motor housing that minimizes magnetic path air gaps.

SUMMARY OF THE INVENTION

This invention therefore proposes permanent magnets having a pattern of protrusions and/or holes that minimizes the effective magnetic air gap to the steel portions of magnetic assemblies such as the inside surfaces of steel motor housings and bonding these permanent magnets to the steel portions of the magnetic assemblies using one or more bonding agents. The permanent magnets and steel portions of magnetic assemblies may be interposed with one another in order to minimize the effective magnetic air gap or alternatively, the permanent magnets and steel portions may employ ultra low profile bonding surfaces that interlock with bonding agents. The bonding agent may be selected from the group of liquid polymer resins such as epoxy. Furthermore, the bonding agent may have added ferromagnetic powdered material to effectively reduce the air gap of the overall magnetic circuit.

BRIEF DESCRIPTION OF THE DRAWINGS

FIG. 9 shows a cross sectional view of curved magnets having ultra low profile bonding protrusions fixedly attached to a steel motor housing having ultra low bonding protrusions.

FIG. 10 shows a cross sectional view of curved magnets having ultra low profile bonding protrusions fixedly attached to a steel motor housing having a matching interposed pattern of ultra low profile protrusions.

DESCRIPTION OF THE INVENTION

Figure 1:
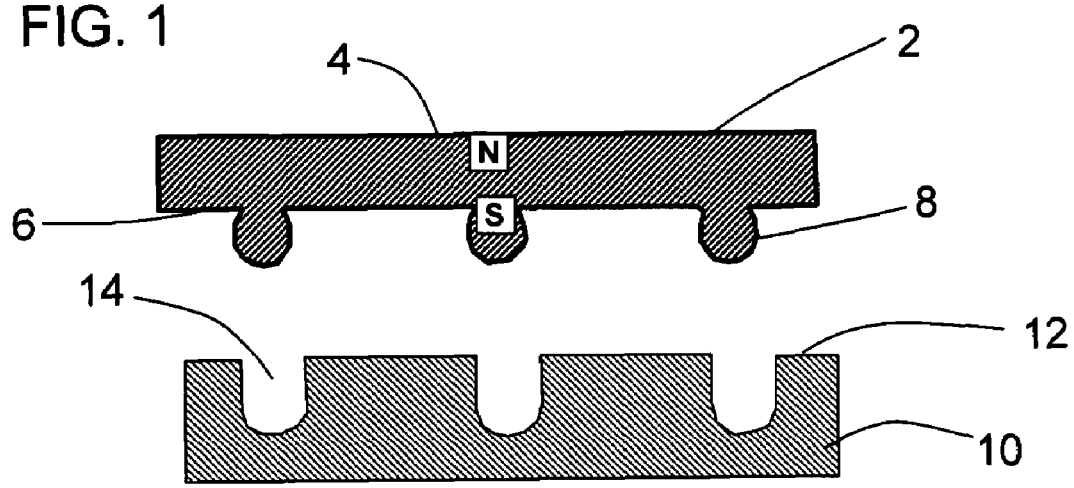
FIG. 1 shows a permanent magnet having surface protrusions facing a steel plate having matching holes.

FIG. 1 shows a permanent magnet having surface protrusions facing a steel plate having matching holes. This particular configuration is suitable for the attachment of permanent magnets to numerous surfaces. Permanent magnet 2 is shown having a north pole face 4 and a south pole face 6. Also shown are protrusions 8 extending outward from south pole face 6. Steel portion 10 is shown having top surface portion 12 facing south pole face 6 of permanent magnet 2. Holes 14 are blind holes drilled into top surface 12 of steel portion 10 and are shown in matching alignment with protrusions 8 of permanent magnet 2.

The resulting fit between permanent magnet 2 and steel portion 10 forms a good bond with a bonding agent (not shown). In addition, the interlocking geometry helps to maintain good magnetic conductivity at the magnet to steel interface with the bonding of permanent magnet 2 to steel portion 10.

Protrusions 8 extending outward from south pole 6 of permanent magnet 2 may be formed by compressing a water based slurry of a suitable magnetic material such as strontium ferrite into the voids of a flexible rubber mold followed by careful removal and subsequent sintering at elevated temperatures. Depending on the permanent magnet material, it may be desirable to carry out the sintering process in the presence of a magnetic field.

Figure 2:
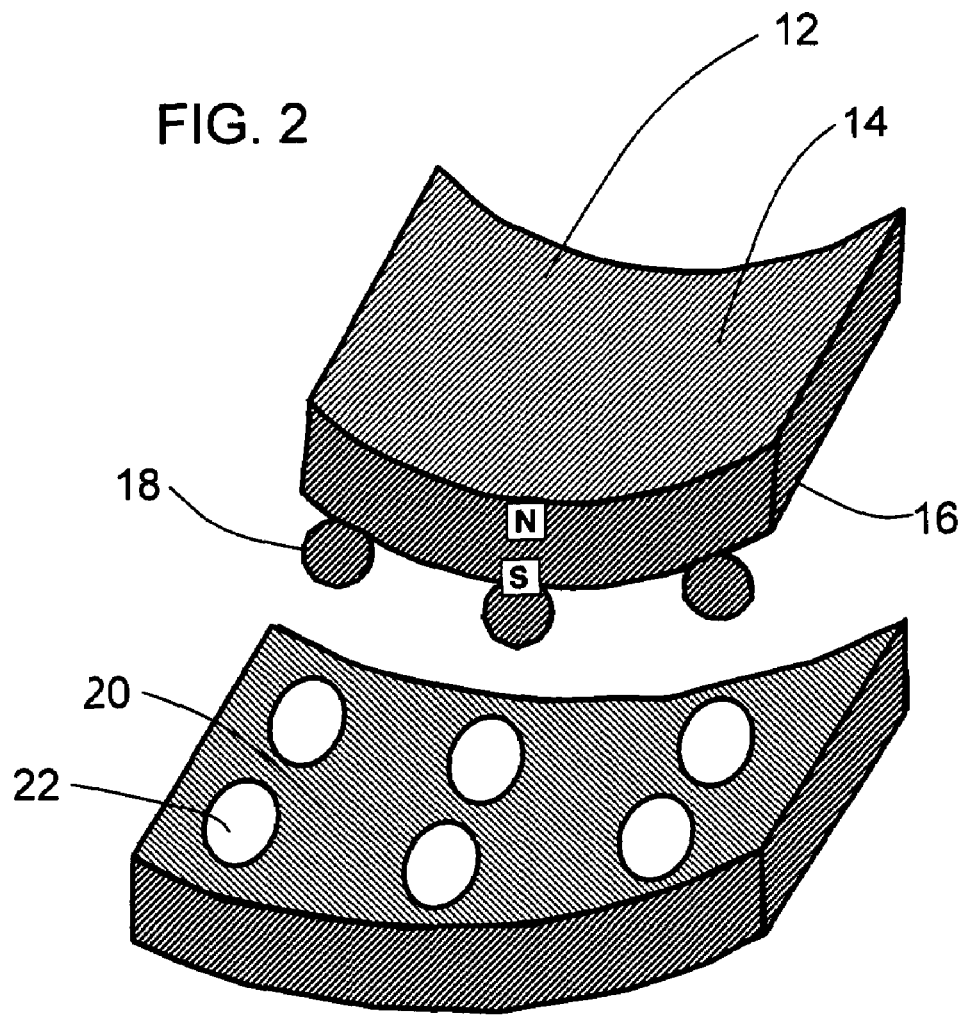
FIG. 2 shows a curved permanent magnet having an outer beaded surface along with a matched hole steel construction.

FIG. 2 shows a permanent magnet having an outer beaded surface along with a matched hole steel construction. Permanent magnet 12 is shown having a north pole face 14 and a south pole face 16. Bead protrusions 18 are located on outer south pole face 16. Also shown is steel section 20. Steel section 20 has holes 22. Holes 22 in steel section 20 are aligned with beads 18 in permanent magnet 12.

This particular construction is suitable for bonding permanent magnets into steel motor housings. It should be noted that the opposite configuration may be employed with the permanent magnet having the holes and the inner surface of the motor housing having beads or bead like protrusions. This configuration may provide enhanced bonding properties that are desirable in permanent magnet electric motors. Tight spacing of permanent magnet material and the motor housing is still preserved and therefore the integrity of the magnetic circuit is preserved as well.

Figure 3:
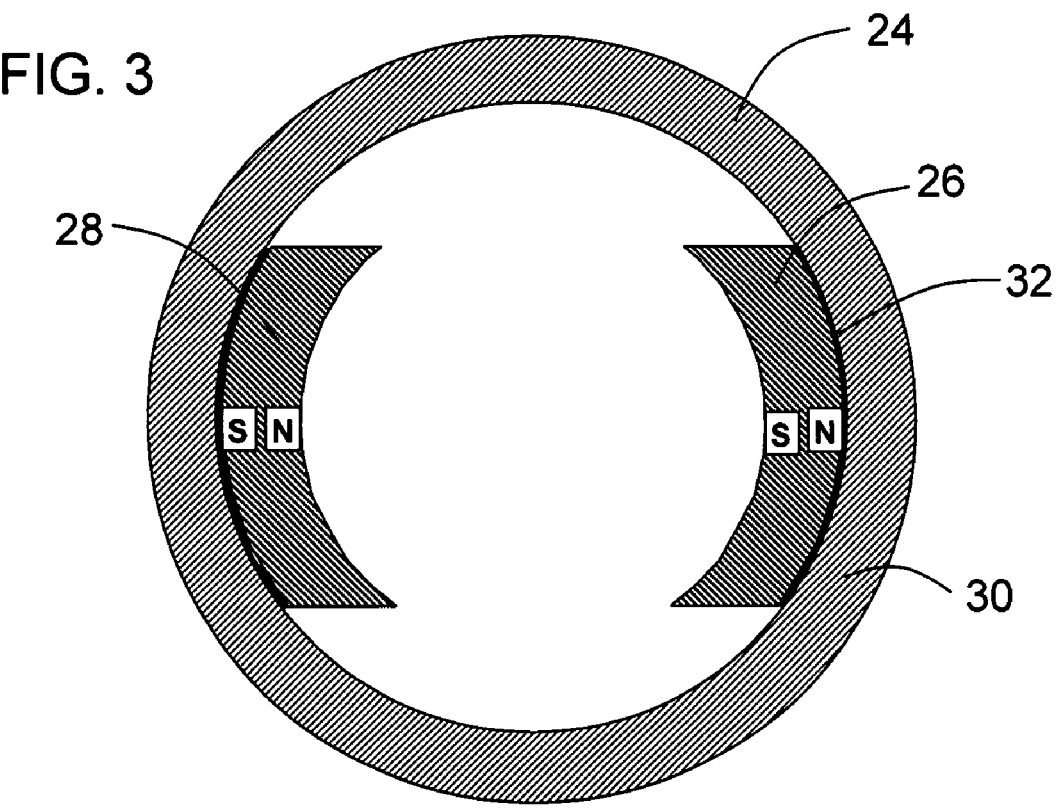
FIG. 3 shows a cross sectional view of curved permanent magnets fixedly attached to a steel motor housing.

FIG. 3 shows a cross sectional view of two curved permanent magnets fixedly attached to a steel motor housing. Motor housing assembly 24 is shown having permanent magnets 26 and 28 fixedly attached to steel motor housing 30 with epoxy bonding agent 32. Permanent magnet 26 is shown having its north pole face against steel motor housing 30 and its south pole face pointing inward toward the central portion of steel motor housing 30. Permanent magnet 28 is shown having its south pole face against steel motor housing 30 and its north pole face pointing inward toward the central portion of steel motor housing 30.

This is a commonly employed permanent magnet assemblies used with brush timed D.C. permanent magnet motors. Unfortunately while being rather effective in design, this particular construction may not be best suited for rare earth permanent magnet motors run at high temperatures and under the conditions of high torque. An improved construction is shown in FIG. 4.

Figure 4:
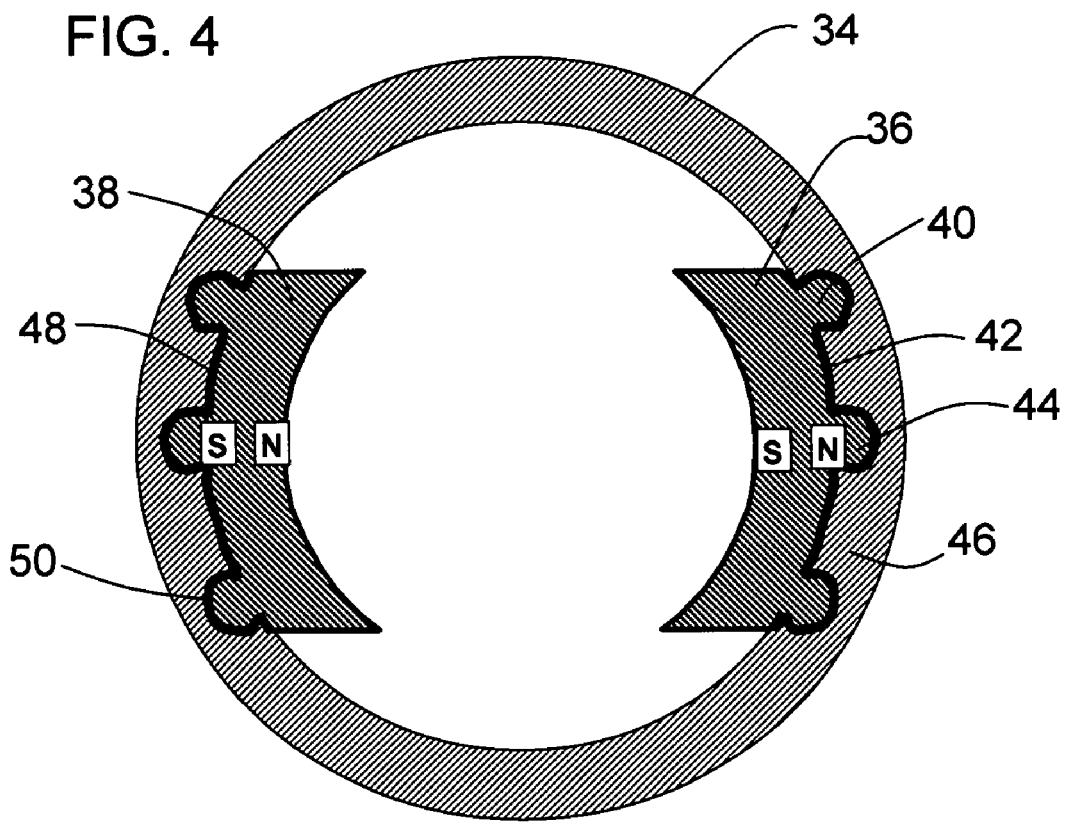
FIG. 4 shows a cross sectional view of curved permanent magnets having protrusions fixedly attached to the inside of a steel motor housing having matching holes.

FIG. 4 shows a cross sectional view of curved permanent magnets having protrusions fixedly attached to the inside of a steel motor housing having matching holes. Motor housing assembly 34 is shown having permanent magnets 36, and 38. Permanent magnets 36 and 38 have protruding portions 40 extending from pole faces 42 and 48. Also shown are blind holes 44 in steel motor housing 46. Blind holes 44 in steel motor housing 46 are matched to protrusions 40 of permanent magnets 36 and 38. Permanent magnets 36, and 38 are shown attached to the inside portion of steel motor housing 46 with bonding agent 50.

Bonding agent 50 may be selected from the epoxy group of liquid bonding agents and may furthermore contain powdered ferromagnetic materials to reduce overall air gap effects. The overall result is a bonded magnet construction that is highly resistant to magnet loosening resulting from high temperature and high torque conditions.

Figure 5:
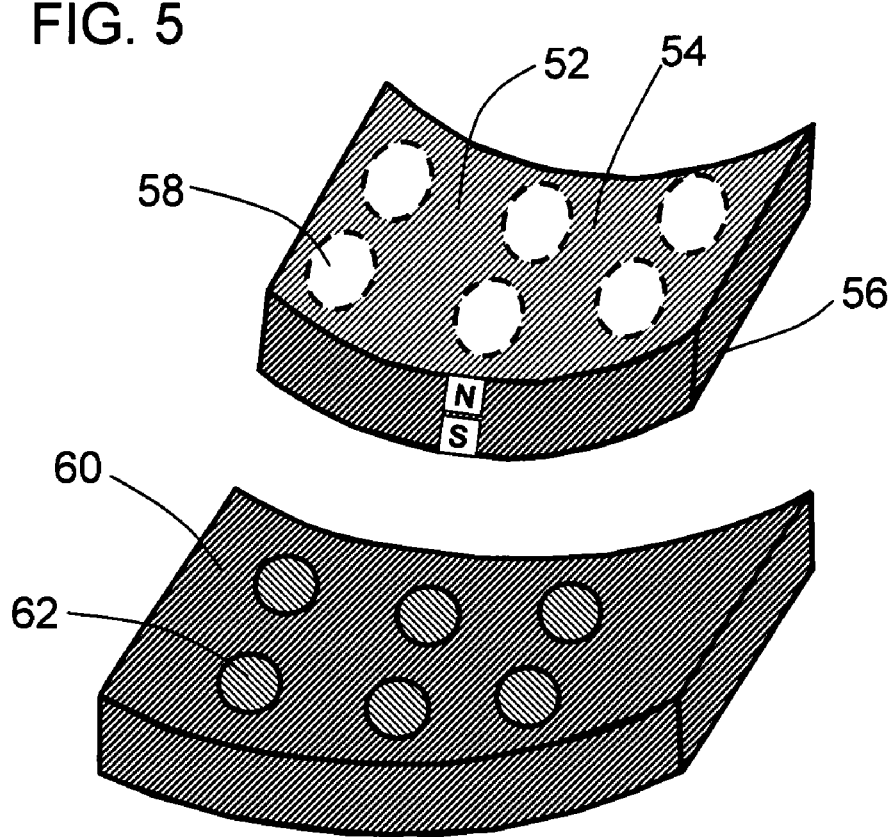
FIG. 5 shows a curved permanent magnet having holes along with a matched steel construction having an outer beaded surface.

FIG. 5 shows a curved permanent magnet having holes along with a matched steel construction having an outer beaded surface. Permanent magnet 52 is shown having a north pole face 54 and a south pole face 56. Holes 58 are located on outer south pole face 56. Also shown is steel section 60. Steel section 60 has protrusions 62. Protrusions 62 in steel section 60 are aligned with holes 58 in permanent magnet 52.

Figure 6:
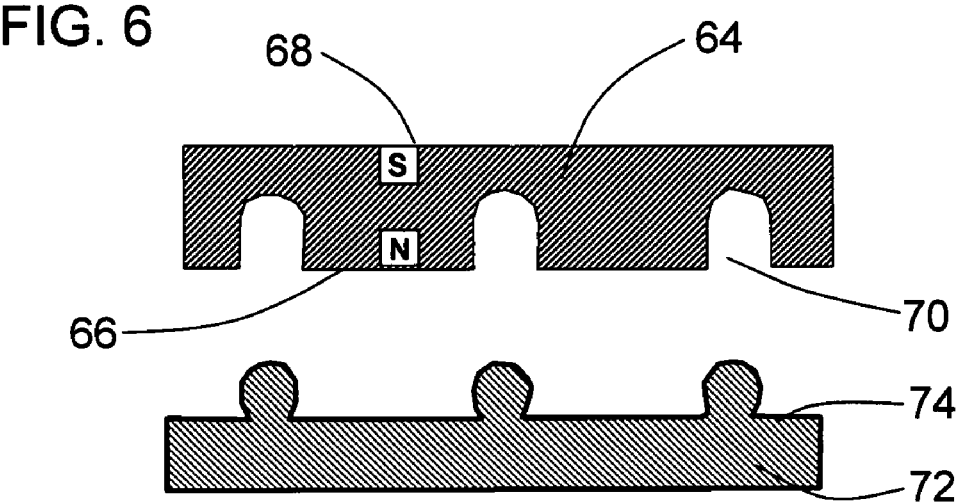
FIG. 6 shows a permanent magnet having holes facing a steel plate having matching protrusions.

FIG. 6 shows a permanent magnet having holes facing a steel plate having matching surface protrusions. This particular configuration is suitable for the attachment of permanent magnets to numerous surfaces. Permanent magnet 64 is shown having a north pole face 66 and a south pole face 68. Also shown are blind holes 70 extending inward from north pole face 66. Steel portion 72 is shown having top surface portion 74 facing north pole face 66 of permanent magnet 64. Protrusions 76 from top surface 74 of steel portion 72 are shown in matching alignment with holes 70 of permanent magnet 64.

It should be noted that for FIGS. 1, 2, 4, 5, and 6 that the holes may be modified from straight wall geometry to a geometry that may represent a hollow cavity having more of a spherical shape than the standard cylindrical shape of traditional holes. The spherically modified holes may be produced in a variety of ways including angled machining, chemical etching and EDM (electrode discharge milling). Holes modified in this manner may provide improved anchorage for the finished part when employing bonding agents.

Figure 7:
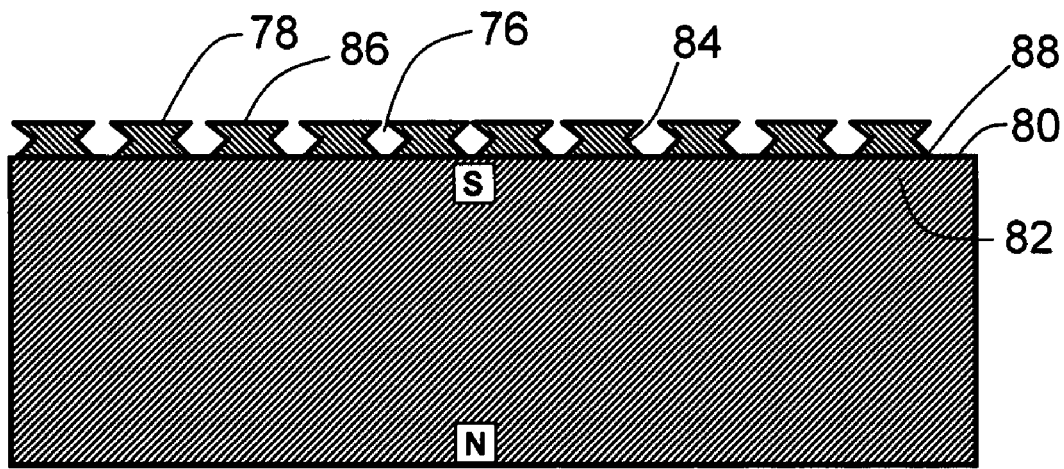
FIG. 7 shows a permanent magnet having ultra low profile protrusions for bonding to another surface.

FIG. 7 shows a cross sectional view of a permanent magnet having ultra low profile protrusions for bonding to another surface. Permanent magnet construction 76 is shown comprised of hour glass shaped protrusions 78 along with permanent magnet portion 80. Also shown is top surface portion 82. Hour glass shaped protrusions 78 are shown extending in an outward direction from top surface portion 82 of permanent magnet portion 80. Also shown are cavities 84 having a suitable geometry for interlocking with liquid bonding agents (not shown). Also shown are exposed top surface portions 86 of hour glass shaped protrusions 78. Exposed top surface portions 86 of hour glass shaped protrusions 78 are shown having significant surface area thereby establishing significant pathways for the efficient transference of magnetic flux with contacting ferro-magnetic surfaces such as steel. Also shown are bottom portions 88 of hour glass shaped protrusions 78. Bottom portions 88 of hour glass shaped protrusions 78 are shown having significant contacting surface area with top surface portion 82 of permanent magnet portion 80 thereby establishing significant pathways for the efficient transference of magnetic flux from top surface portion 82 of permanent magnet portion 80 and bottom portions 88 of hour glass shaped protrusions 78.

Hour glass shaped protrusions 78 extending in an outward direction from top surface portion 82 of permanent magnet portion 80 may be formed by casting an aqueous slurry of a suitable magnetic material (such as strontium ferrite) into a mold made from a burnable material and subsequently sintering. The sintering process may therefore be used to simultaneously form the magnet and attached protrusions while and burn away the mold.

Figure 8:
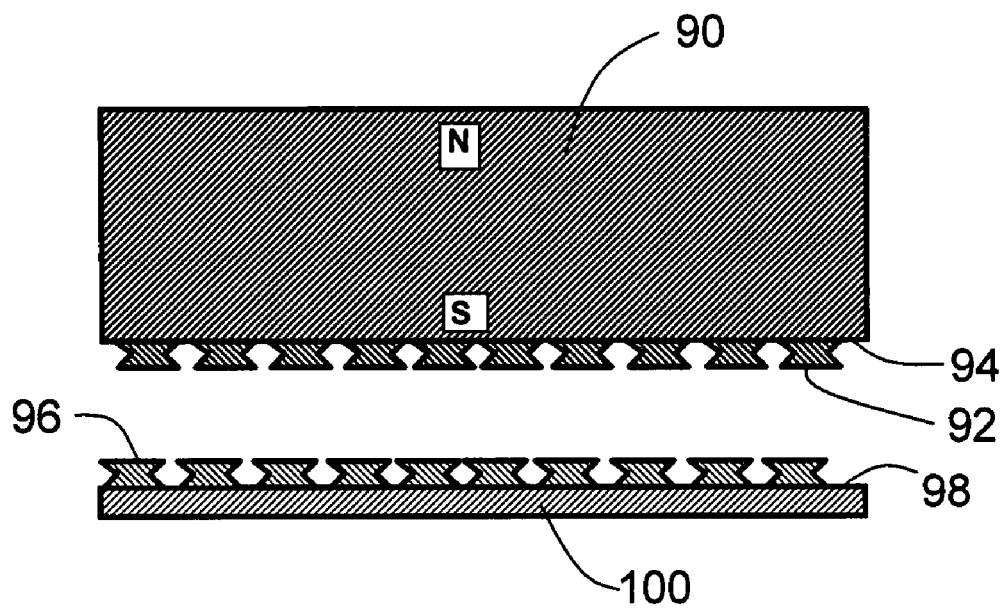
FIG. 8 shows a permanent magnet having ultra low profile bonding protrusions facing a steel plate having ultra low profile bonding protrusions.

FIG. 8 shows a permanent magnet having ultra low profile bonding protrusions facing a steel plate having ultra low profile bonding protrusions. Permanent magnet 90 is shown having hour glass shaped protrusions 92 extending in an outward direction from surface 94. Hourglass shaped protrusions 92 are shown facing hourglass shaped protrusions 96 extending in an outward direction from surface portion 98 of high permeability steel plate 100.

FIG. 9 shows a cross sectional view of curved magnets having ultra low profile bonding protrusions fixedly attached to a steel motor housing having ultra low bonding protrusions. Motor housing assembly 102 is shown having permanent magnets 104, and 106. Permanent magnets 104 and 106 have protruding portions 108 having an ultra low profile geometry as shown in detail in FIG. 7 extending from pole faces 110 and 116. Also shown are ultra low profile protrusions 112 extending in an outward direction from steel motor housing 114. Ultra low profile protrusions 112 extending in an outward direction from steel motor housing 114 are shown aligned to protrusions 108 extending in an outward direction from pole faces 110 and 116 of permanent magnets 104 and 106. Permanent magnets 104, and 106 are shown attached to the inside portion of steel motor housing 114 with bonding agent 118.

Bonding agent 118 may be selected from the epoxy group of liquid bonding agents and may furthermore contain powdered ferromagnetic materials to reduce overall air gap effects. The overall result is a bonded magnet construction that is highly resistant to magnet loosening resulting from high temperature and high torque conditions.

FIG. 10 shows a cross sectional view of curved magnets having ultra low profile bonding protrusions fixedly attached to a steel motor housing having a matching interposed pattern of ultra low profile protrusions. Motor housing assembly 120 is shown having permanent magnets 122, and 124. Permanent magnets 122 and 124 have protruding portions 126 having an ultra low profile geometry as shown in detail in FIG. 7 extending from pole faces 128 and 134. Also shown are ultra low profile protrusions 130 extending in an outward direction from steel motor housing 132. Ultra low profile protrusions 130 extending in an outward direction from steel motor housing 132 are shown aligned with and extending into spaces 138 between protrusions 126 extending in an outward direction from pole faces 128 and 134 of permanent magnets 122 and 124. Permanent magnets 122, and 124 are shown attached to the inside portion of steel motor housing 132 with bonding agent 136.

Bonding agent 136 may be selected from the epoxy group of liquid bonding agents and may furthermore contain powdered ferromagnetic materials to reduce overall air gap effects. The overall result is a bonded magnet construction that is highly resistant to magnet loosening resulting from high temperature and high torque conditions.

Those skilled in the art will understand that the preceding exemplary embodiments of the present invention provide foundation for numerous alternatives and modifications. These other modifications are also within the scope of the limiting technology of the present invention. Accordingly, the present invention is not limited to that precisely shown and described herein but only to that outlined in the appended claims.

What is claimed is:

1. A permanent magnet bonding construction for efficient conduction of magnetic flux comprising:

a high magnetic permeability first bonding surface having a first plurality of ultra low profile protrusions extending in an outward direction, said first plurality ultra low profile protrusions having top surfaces;

a permanent magnet with sufficiently consistent thickness throughout for virtually no loss in overall magnetic properties, said permanent magnet having a second bonding surface, said second bonding surface having a second plurality of ultra low profile protrusions extending in an outward direction, said second plurality of ultra low profile protrusions having top surfaces, wherein said top surfaces of said second plurality of ultra low profile protrusions are in contact with said top surfaces of said first plurality of ultra low profile protrusions; and a bonding agent, said bonding agent bonds said first bonding surface and said second bonding surface, said bonding agent is in between said first plurality of ultra low profile protrusions and in between said second plurality of ultra low profile protrusions, whereby there is virtually no loss in overall magnetic properties.

2. A permanent magnet bonding construction as recited in claim 1 wherein said bonding agent further contains a material having a high magnetic permeability.

3. A permanent magnet bonding construction as recited in claim 2 wherein said high magnetic permeability material is powdered iron.

4. A permanent magnet bonding construction as recited in claim 1 wherein said permanent magnet bonding construction comprises a magnet and housing assembly for a permanent magnet motor.

5. A permanent magnet bonding construction as recited in claim 2 wherein said permanent magnet bonding construction comprises a magnet and housing assembly for a permanent magnet motor.

6. A permanent magnet bonding construction as recited in claim 3 wherein said permanent magnet bonding construction comprises a magnet and housing assembly for a permanent magnet motor.

7. A permanent magnet bonding construction as recited in claim 1 wherein said first plurality of ultra low profile protrusions have an interlocking geometry such as an hour glass shape.

8. A permanent magnet bonding construction as recited in claim 1 wherein said second plurality of ultra low profile protrusions have an interlocking geometry such as an hour glass shape.

9. A permanent magnet bonding construction for efficient conduction of magnetic flux comprising:

a high magnetic permeability first bonding surface having a first plurality of ultra low profile protrusions extending in an outward direction, said first plurality ultra low profile protrusions having top surfaces;

a permanent magnet with sufficiently consistent thickness throughout for virtually no loss in overall magnetic properties, said permanent magnet having a second bonding surface, said second bonding surface having a second plurality of ultra low profile protrusions extending in an outward direction, said second plurality of ultra low profile protrusions having top surfaces, wherein said top surfaces of said second plurality of ultra low profile protrusions are in contact with said first bonding surface and said top surfaces of said first plurality of ultra low profile protrusions are in contact with said second bonding surface; and a bonding agent, said bonding agent bonds said first bonding surface and said second bonding surface, said bonding agent is in between said first plurality of ultra low profile protrusions and in between said second plurality of ultra low profile protrusions, whereby there is virtually no loss in overall magnetic properties.

10. A permanent magnet bonding construction as recited in claim 9 wherein said bonding agent further contains a material having a high magnetic permeability.

11. A permanent magnet bonding construction as recited in claim 10 wherein said high magnetic permeability material is powdered iron.

12. A permanent magnet bonding construction as recited in claim 9 wherein said permanent magnet bonding construction comprises a magnet and housing assembly for a permanent magnet motor.

13. A permanent magnet bonding construction as recited in claim 10 wherein said permanent magnet bonding construction comprises a magnet and housing assembly for a permanent magnet motor.

14. A permanent magnet bonding construction as recited in claim 11 wherein said permanent magnet bonding construction comprises a magnet and housing assembly for a permanent magnet motor.

15. A permanent magnet bonding construction as recited in claim 9 where said first plurality of ultra low profile protrusions have an interlocking geometry such as an hour glass shape.

16. A permanent magnet bonding construction as recited in claim 9 where said second plurality of ultra low profile protrusions have an interlocking geometry such as an hour glass shape.

* * * * *